A. G. ROGERS.
Animal-Trap.
No. 223,760. Patented Jan. 20, 1880.
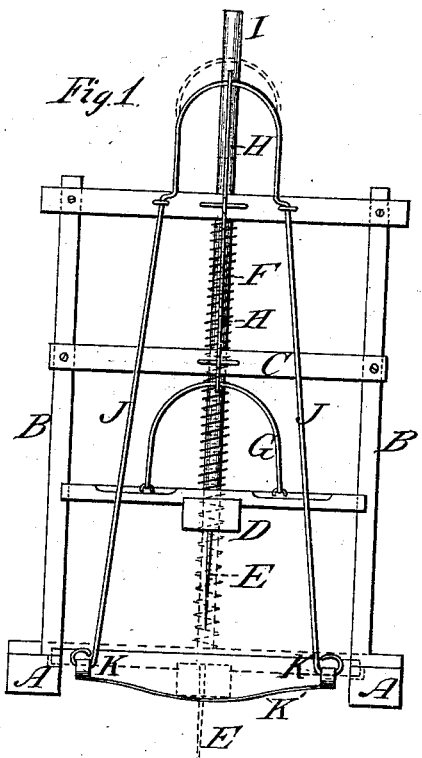
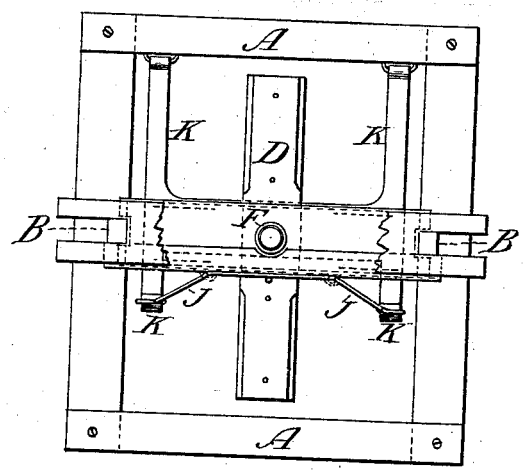
Attest:
Lorence Bever.
John F. Stevens
Inventor.
Albert Gallatin Rogers

UNITED STATES PATENT OFFICE.

ALBERT G. ROGERS, OF LATHROP, MISSOURI, ASSIGNOR OF ONE-HALF OF HIS RIGHT TO REUBEN B. ROGERS, OF SAME PLACE.

ANIMAL-TRAP.

SPECIFICATION forming part of Letters Patent No. 223,760, dated January 20, 1880.

Application filed August 1, 1879.

*To all whom it may concern:*

Be it known that I, ALBERT GALLATIN ROGERS, of Lathrop, in the county of Clinton, in the State of Missouri, have invented a new and Improved Mole-Trap; and I do hereby declare that the following is a full and exact description thereof, reference being had to the accompanying drawing, and to the letters of reference marked thereon.

The object of my invention is to provide a trap for catching moles; and it consists of a horizontal ground-frame having an upright guide for controlling the vertical movements of a head-block and shaft.

It further consists in having spears or tines vertically disposed along the under side of the head-block, and in having the head-block and shaft connected with a treadle and tripping device, as will hereinafter be more fully set forth.

In the drawing, Figure 1 represents a trap set and ready for the action of the mole.

A is the ground frame-work of the trap, having two posts, B, on opposite sides of the frame. These posts are connected near their upper ends and at the top by means of beams C C.

D is a horizontal head-block, supported by a vertical shaft, I, which is centrally attached to the head-block. The shaft I is journaled to the cross-beams C in such a manner as to permit a vertical movement of the shaft and head-block.

Spears or tines E, having their sharpened ends pointing downwardly, project from the under side of the head-block D. These tines are preferably disposed in a straight line along the block.

A coiled spring, F, is placed around the vertical shaft I, so that the lower end of said spring operates against the head-block D and the upper end against the lower cross-beam, C, the action of the spring thus forcing the head-block downward and causing the tines E to enter the ground.

A trigger, H, vertically disposed and centrally pivoted to the middle of the upper cross-beam, C, has a hook on its lower end, over which is placed a looped wire, G, attached to the head-block. By this means the head-block and tines are suspended.

Hinged to one end of the ground-frame is a treadle having two arms, K K, and a cross-piece, K′, rigidly uniting said treadles at a point near the middle of the ground-frame, and in such a manner that the said cross-piece crosses the line of the tines at right angles, the object of which will be hereinafter explained.

A trip-wire, J, having its ends fastened to the two arms K K of the treadle, has its looped portion of sufficient length to reach the upper end of the trigger H.

Having described the construction of the invention, I will now describe its operation. The trap is placed over a mole-ridge and pressed down so it will stand firmly, the cross-piece K′ of the treadle being used to crush down the ridge for the purpose of closing up the channel formed by the mole. The frame A is then staked to the ground and the trap set, as heretofore shown. The mole-ridge extends in the direction of the line of the tines and the cross-piece K′ of the treadle at right angles or across the ridge. The mole, in forcing its way through the channel, passes under the cross-piece K′, raising it, and, by means of the looped trip-wire J, communicating with the upper end of the trigger H, trips the loop G, and the spring F forces the head-block D down, impaling the mole by means of the tines E.

Having thus described my invention, what I claim as new, and desire to secure by Letters Patent, is—

1. The treadles K K, having a cross-piece, K′, at right angles to the direction of the row of tines E, in combination with the looped trip-wire J, substantially as and for the purpose set forth.

2. The treadles K K, having a cross-piece, K′, at right angles to the direction of the row of the tines E, provided with a looped trip-wire, J, substantially as and for the purpose herein set forth.

3. The combination of the vertically-movable shaft I, actuated by spring F, and having horizontal head-block D, tines E, and looped wire G, with treadle K K′, trip-wire J, and trigger H, substantially as and for the purpose specified.

ALBERT GALLATIN ROGERS.

Witnesses:
LORENCE BEVER,
JOHN F. STEVENS.